United States Patent [19]

DeWitt

[11] Patent Number: 5,324,267
[45] Date of Patent: Jun. 28, 1994

[54] SLITTED PRESSURE CUFF CHECK VALVE

[75] Inventor: Scott H. DeWitt, Lockport, N.Y.

[73] Assignee: Harmac Medical Products, Inc., Buffalo, N.Y.

[21] Appl. No.: 944,477

[22] Filed: Sep. 14, 1992

[51] Int. Cl.$^5$ .............. A61M 37/00; F04B 43/00; F16K 17/26

[52] U.S. Cl. .................. 604/142; 417/480; 417/566; 137/493.8

[58] Field of Search ............... 604/142, 141, 75, 213; 128/DIG. 12; 222/213, 212; 417/480, 474, 569, 566; 137/845, 849, 493.8, 846

[56] References Cited

U.S. PATENT DOCUMENTS

| 637,798 | 11/1899 | Johnson | 417/566 |
|---|---|---|---|
| 2,057,726 | 10/1936 | Landis | 137/855 |
| 2,189,554 | 2/1940 | Schweiss | 417/566 |
| 2,515,110 | 7/1950 | Bornstein | 417/566 |
| 2,809,589 | 10/1957 | Randolph | 417/566 |
| 4,437,490 | 3/1984 | Demers et al. | 137/854 |
| 4,646,945 | 3/1987 | Steiner et al. | 137/845 |
| 5,053,011 | 10/1991 | Strobel et al. | 604/142 |

FOREIGN PATENT DOCUMENTS 92007614  5/1992  PCT Int'l Appl. ............ 604/142

Primary Examiner—John G. Weiss
Attorney, Agent, or Firm—Woodcock Washburn Kurtz Mackiewicz & Norris

[57] ABSTRACT

A check valve for disposable pressure infusion systems having an inflation bulb with a single open end includes a valve body with a pair of intake ports and a discharge port. Disposed at such single open end of the inflation bulb, one of the intake ports permits a flow of pressurizing air from the inflation bulb when squeezed to a pressure cuff through flexible tubing coupled to the discharge port. A flexible diaphragm having slitted openings is disposed within the check valve which provides for opening and closure of a specific port alternatively during squeezes and release of the inflation bulb.

11 Claims, 3 Drawing Sheets

SLITTED PRESSURE CUFF CHECK VALVE

FIELD OF THE INVENTION

This invention relates generally to a pressure infusion system, and more particularly to check valves which are used with inflation bulbs in such systems.

BACKGROUND OF THE INVENTION

Liquids administered by intravenous injection, such as whole blood, plasma, saline and dextrose solutions, are typically supplied in disposable infusion bags which are most often made of a flexible, transparent plastic having an outlet port or delivery tube which is adapted to be punctured by a coupler of a recipient set. In use, the infusion bag is suspended above the patient and the liquid contained therein is permitted to flow by gravity into the patient's vein. There are many situations, particularly when the infusion bag is nearly empty or in cases of severe hemorrhage and shock, where the administration of fluid by gravity flow with conventionally employed infusion bags is unacceptably slow.

Various pressure infusion apparatus have been used in the past to overcome such problems of slow delivery. See, for example, U.S. Pat. No. 2,766,907, issued to Wallace, Jr.; U.S. Pat. No. 3,153,414, issued to Beall et al.; U.S. Pat. No. 4,090,514, issued to Hinck et al.; U.S. Pat. No. 4,507,116, issued to Leibinsohn; and U.S. Pat. No. 4,735,613, issued to Bellin et al. Such known pressure infusion apparatus characteristically comprises bladder means for maintaining a fluid under pressure, means forming a pocket with the bladder means for holding an infusion bag against the bladder means for pressurizing the infusion bag by transmission of pressure from the pressurized bladder means to the infusion bag, and pressurization means which is coupled to the bladder means for introducing a flow of the fluid into the bladder means and thereby pressurizing same. A conventional inflation, or "squeeze" bulb is typically used as a pressurization means to minimize manufacturing costs.

One problem with such inflation bulbs is their tendency to leak and, therefore, their inability to maintain pressure during use of the pressure infusion apparatus. Typically, inflation bulbs used with pressure infusion apparatus are of a "double-ended" type, such as the inflation bulbs which are shown in the above-referenced patents of Beall et al., Hinck et al., Leibinsohn and Bellin et al. These double-ended inflation bulbs are so called because they have one check valve at the distal end of the inflation bulb and another check valve at the proximal end of the inflation bulb. A squeezing of this type of inflation bulb simultaneously closes the distal end check valve while opening the proximal end check valve, and thereby creates a positive pressure for pumping air into the bladder means. When such inflation bulbs are released, the distal end check valve opens and the proximal end check valve closes to create a negative pressure until the inflation bulb is reinflated. Since the distal end check valve in such double-ended inflation bulbs is exposed to the ambient air, it can be readily appreciated that these check valves may leak.

Accordingly, it is desirable to use a single-ended inflation bulb having a check valve at the end, wherein the check valve has two valves, one valve for providing a passage for fluid flow from the inflation bulb to the bladder means during squeezes of the bulb, and a second valve for providing a passage for fluid flow from an intake port to the inflation bulb during releases of the bulb, in order to refill the bulb with air. Check valves are known, such as that disclosed in U.S. Pat. No. 4,437,490, issued to Demers et al, which comprise a dual valve assembly, wherein a flexible diaphragm provides for opening of one valve and simultaneous closure of the other valve, in order to alternately allow fluid flow through one valve and prevent fluid flow through the other valve. Such a valve comprises a flexible diaphragm which has flaps or reeds which provide for opening and closure of the fluid flow ports.

However, a problem has been recognized in that the use of flap or reed type diaphragms in dual flow check valves may be ineffective in some cases. The flaps are prone to curling and/or twisting, causing attendant leakage at the valve closures and tearing of the diaphragm material.

Therefore, there is a need for a single-ended inflation bulb for use in a pressure infusion system, wherein a flexible diaphragm effectively provides for closure of a specific valve and is not prone to the problems associated with flapping or curling. The present invention provides a check valve which satisfies this need.

SUMMARY OF THE INVENTION

A pressure infusion system in accordance with the present invention comprises a pressure cuff check valve having a slitted flexible diaphragm which is disposed within a housing having a first and second intake port and a discharge port, such that the slitted diaphragm provides for opening of a valve at the second intake port to allow fluid to flow through that valve and simultaneous closure of the valve at the discharge port to prevent fluid flow through that port and, alternatively, provides for opening of the valve at the discharge port and simultaneous closure of the valve at the second intake port.

DETAILED DESCRIPTION OF THE PREFERRED EMBODIMENTS

Figure 1:
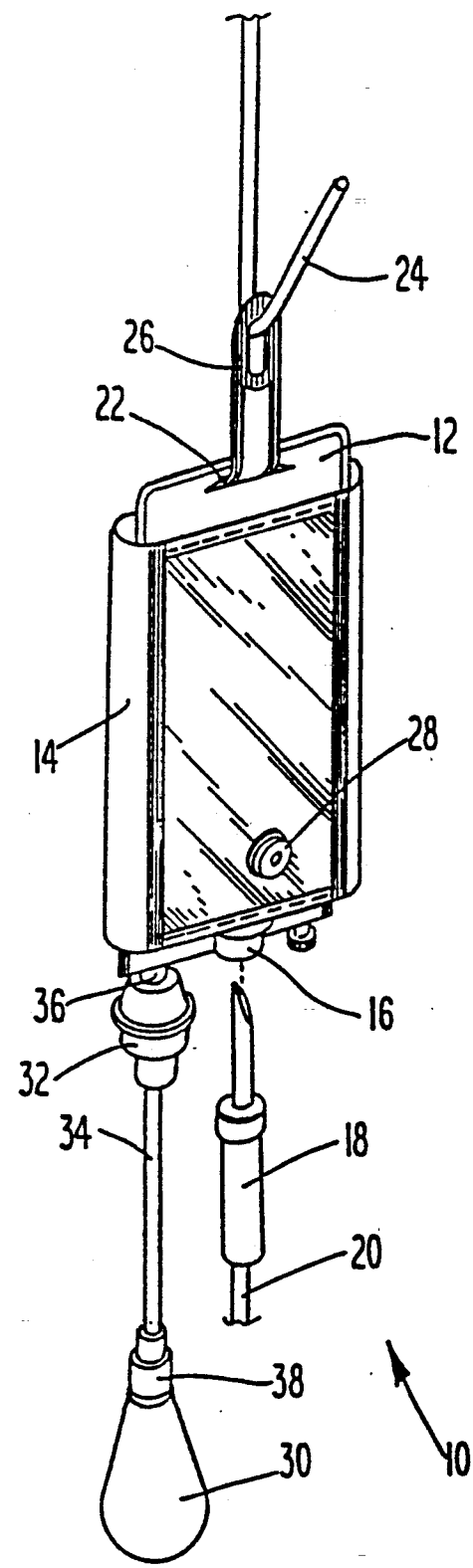
FIG. 1 illustrates pressure infusion apparatus having a disposable pressure cuff and check valve means in accordance with the present invention.

Referring now to the drawings, wherein identical numbers designate like or corresponding parts throughout the several views, there is shown in FIG. 1 pressure infusion apparatus 10 for use in pressurizing an infusion bag 12 with a disposable pressure cuff 14 according to the present invention.

As is well known, the typical infusion bag 12 is fitted with an outlet port 16 adapted to be punctured by a coupler 18 of a recipient set. Liquids, such as whole blood, plasma, saline or dextrose solutions, contained in the infusion bag 12 are supplied to the patient through intravenous injection by way of a delivery tube 20. The infusion bag 12 also conventionally includes a slit 22 for hanging the pressure infusion apparatus 10 from a hook 24, by way of a hanger 26 that is threaded through such slit 22. For the purpose of injecting a drug into the administered liquid, the infusion bag 12 may also be fitted with an injection port 28.

The pressure infusion apparatus 10, as is conventional, includes bladder means for maintaining a fluid under pressure and means for pumping a flow of the fluid into the bladder means. As shown in FIG. 1, the pumping means comprises an inflation bulb 30 which is coupled to a pressure gauge 32 by way of flexible tubing 34. The pressure gauge 32, in turn, couples to the bladder means by way of a pressurization port 36. It should be noted that such inflation bulb 30, unlike inflation bulbs which have been used in the prior art pressure infusion apparatus, is of the single-ended type. Accordingly, in order to maintain a flow of a pressurizing fluid from the inflation bulb 30 to the bladder means of pressure cuff 14, the inflation bulb 30 includes a check valve means 38 as described in greater detail herein below.

Figure 2:
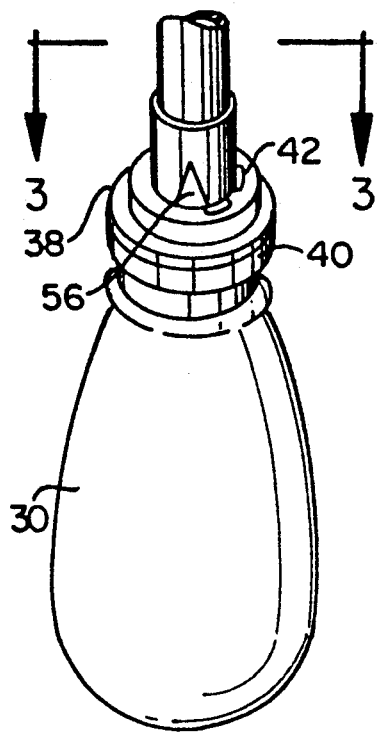
FIG. 2 illustrates an inflation bulb and check valve means shown in FIG. 1.
Figure 3:
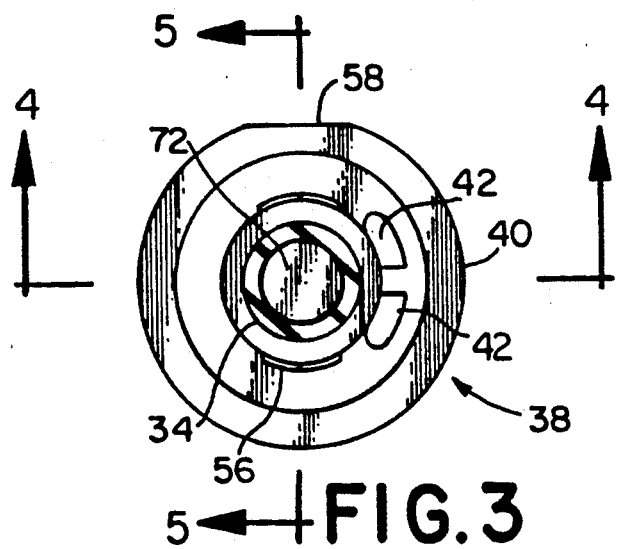
FIG. 3 illustrates a top view of the check valve means shown in FIG. 2, taken along the lines 3—3.
Figure 4:
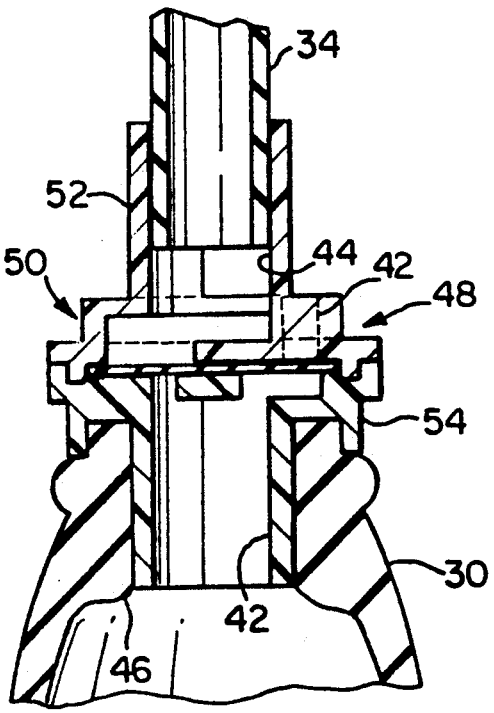
FIG. 4 is a sectional view of the check valve means shown in FIG. 3, taken along the lines 4—4.

Referring to FIGS. 2–8, and specifically to FIG. 4, it will be seen that check valve means 38 according to one embodiment of the present invention generally comprises a valve body 40 with a pair of intake ports 42 and a discharge port 44, wherein one of the intake ports 42 couples to the single open end 46 of inflation bulb 30. A first valve 48 cooperates with the other intake port 42, and is adapted to permit a flow of the pressurizing fluid in a direction through such other intake port 42 to inflation bulb 30, during releases of the inflation bulb, as described in greater detail herein below. In a similar manner, a second valve 50 cooperates with discharge port 44 and is adapted to permit a flow of the pressurizing fluid in a direction through discharge port 44, from inflation bulb 30, during squeezes of the inflation bulb.

Figure 5:
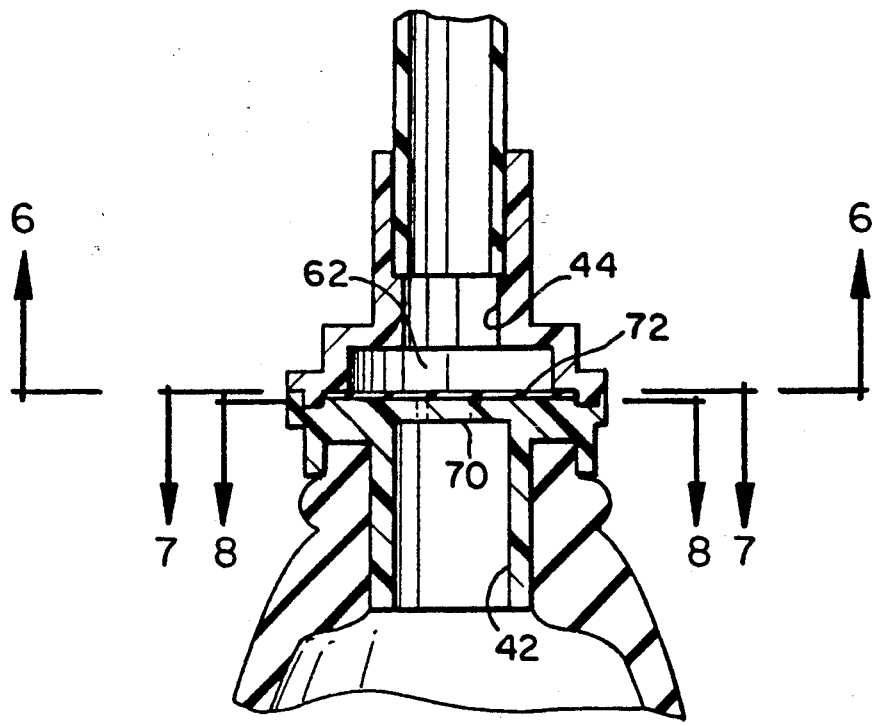
FIG. 5 is another sectional view of the check valve means shown in FIG. 3, taken along the lines 5—5.
Figure 6:
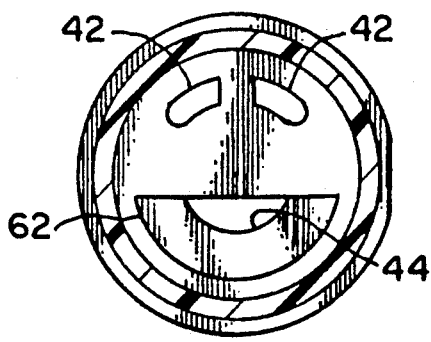
FIG. 6 is a sectional view of the check valve means shown in FIG. 5, taken along the lines 6—6.

In the embodiment shown in FIGS. 4–8, valve body 40 is suitably formed in two parts, an upper portion 52 and lower portion 54, each portion being formed from lightweight, low cost, easily-formed plastic. As shown in FIGS. 2 and 3, valve body 40 comprises direction indicator 56, which indicates the direction toward the object to be pressurized, for ease of installment of check valve means 38 with inflation bulb 30 and flexible tubing 34. Also, both the upper portion 52 and lower portion 54 of valve body 40 comprise locater 58, which provides for ease in joining the upper and lower portions to form valve body 40, such that the first and second valves are in proper alignment. In the preferred embodiment, locater 58 includes a generally flat surface formed on each portion 52, 54. Positioning the flat surfaces to be substantially coplaner assures the alignment of portions 52 and 54, as shown in FIG. 6. Valve body 40 may be bonded to inflation bulb 30 and flexible tubing 34 by any conventional means, such as epoxy.

Figure 7:
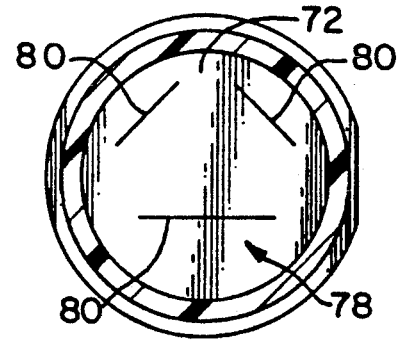
FIG. 7 is another sectional view of the check valve means shown in FIG. 5, taken along the lines 7—7.
Figure 8:
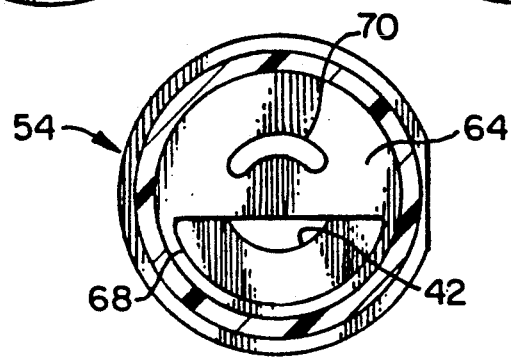
FIG. 8 is another sectional view of the check valve means shown in FIG. 5, taken along the lines 8—8.

Referring again to FIGS. 4–8, upper portion 52 of valve body 40 has a proximal and distal end, wherein the proximal end of upper portion 52 receives flexible tubing 34. The distal end of upper portion 52 comprises first substantially solid surface 60 which has an upper passage 62 and further has two aperture which form the other intake port 42. It will be recognized that intake port 42 may be formed in upper portion 52 by one or more aperture in a variety of arrangements, and the present invention is not intended to be limited to the embodiment shown. In a similar manner, lower portion 54 has a proximal and distal end, wherein the proximal end of lower portion 54 is received by inflation bulb 30. The distal end of lower portion 54 comprises second substantially solid surface 64, as shown in FIG. 8, which has a lower passage 68 and further has a partially annular aperture 70. Accordingly, lower passage 68 forms first valve 48 which cooperates with the other intake port 42 to permit a flow of the pressurizing fluid in a direction through such other intake port 42 and into inflation bulb 30. Similarly, upper passage 62 forms second valve 50 which cooperates with discharge port 44, via partially annular aperture 70, to permit a flow of the pressurizing fluid in a direction from inflation bulb 30 and through discharge port 44.

Figure 9:
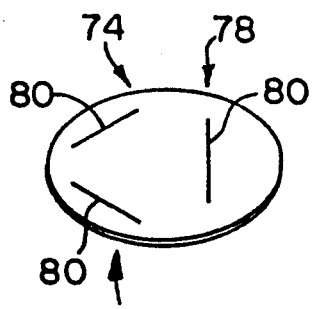
FIG. 9 illustrates a preferred embodiment of a diaphragm in accordance with the present invention.

Diaphragm 72 is located within valve body 40. In a preferred embodiment of the present invention, diaphragm 72 is made of a flexible and resilient elastomeric material. As shown in the embodiment of FIGS. 7 and 9, diaphragm 72 has first slit section 74 and second slit section 78, wherein each of the slit sections has at least one slitted opening 80. Referring to FIG. 5, and as shown in FIGS. 7 and 8, the top surface of first slit section 74 cooperates with upper passage 62 in upper portion 52, while the bottom surface of first slit section 74 is disposed against second substantially solid surface 64 of lower portion 54. In a similar manner, and referring to FIGS. 6 and 7, the bottom surface of second slit section 78 cooperates with lower passage 68 in lower portion 54, while the top surface of second slit section 78 is disposed against first substantially solid surface 60 of upper portion 52.

In the embodiment shown in FIG. 9, first slit section 74 has two slitted openings 80 arranged in an angular relationship to one another, while second slit section 78 has one slitted opening 80. This is not intended to be limiting in any manner, and various numbers and arrangement of the slitted openings in each slit section are within the scope of this invention.

Having described the details of construction of a preferred embodiment of check valve means 38 according to the present invention, operating details thereof are as follows. In steady state where inflation bulb 30 is not squeezed, the slitted openings 80 in diaphragm 72 remain in a closed position.

When inflation bulb 30 is squeezed, pressurizing air flows through intake port 42 that is disposed at single open end 46 of inflation bulb 30. Since slitted opening 80 of second slit section 78 is disposed against first substantially solid surface 60 of upper portion 52, this slitted opening is sealed in a closed position, thus closing first valve 48 and preventing air from leaking through other intake port 42. Accordingly, the pressurizing air flows through partially annular aperture 70. The force of the pressurizing air against the flexible diaphragm 72, causes slitted openings 80 in first slit section 74 to open in cooperation with upper passage 62 in upper portion 52, thus opening second valve 50. The pressurizing air flows through discharge port 44 and flexible tubing 34 and into pressure cuff 14 to pressurize infusion bag 12 in a manner well known in the art.

When the flow of pressurizing air from inflation bulb 30 ceases, elastomeric qualities of slitted openings 80 in first slit section 74 cause those members to close to their original position.

Subsequently, upon releasing of inflation bulb 30, suction creates reduced pressure at intake port 42 disposed at the single open end 46 of inflation bulb 30. Since high atmospheric pressure conditions exist at other intake port 42, air is forced against flexible diaphragm 72, causing slitted opening 80 in second slit section 78 to open in cooperation with lower passage 68 in lower portion 54, thus opening first valve 48. Accordingly, air flows through first valve 48 and into inflation bulb 30 to return the bulb to its filled steady state. Since slitted openings 80 in first slit section 74 are disposed against second substantially solid surface 64 of lower portion 54, these slitted openings are sealed in a closed position, thus closing second valve 50. This prevents fluid from traveling back through flexible tubing 34 and second valve 50 and into inflation bulb 30. When inflation bulb 30 is filled, and the pressure differential across first valve 48 is minimal, elastomeric qualities of the slitted opening 80 in second slit section 78 cause that member to close to its original position. Accordingly, inflation bulb 30 is ready to be squeezed to further pressurize pressure cuff 14.

Although particular embodiments of the present invention have been described and illustrated herein, it is recognized that modifications and variations may readily occur to those skilled in the art. Consequently, it is intended that the claims be intended to cover such modifications and equivalents.

What is claimed is:

1. A check valve for use with an inflation bulb of a pressure infusion device, wherein said bulb has an inlet, said check valve comprising:
    a body member comprising first and second intake ports and a discharge port, said first intake port adapted to be coupled to said inlet of said inflation bulb, said body member having first and second substantially continuous surfaces formed therein, said first continuous surface adjacent to said first intake port, said second continuous surface disposed between and adjacent to said second intake port and said discharge port; and
    a flexible diaphragm disposed within said body member, said diaphragm having first and second slit sections, each of said slit sections having at least one slit and each of said slit sections having an upper and lower surface, said upper surface of said first slit section cooperative with said discharge port and said lower surface of said first slit section disposed against said first continuous surface, said lower surface of said second slit section cooperative with said first intake port and said upper surface of said second slit section disposed against said second continuous surface of said body member.

2. The check valve according to claim 1, wherein said body member is formed from first and second halves, said lower surface of said first slit section disposed against said first continuous surface formed in said first half and said upper surface of said second slit section disposed against said second continuous surface formed in said second half.

3. The check valve according to claim 2, wherein said diaphragm is held between said first and second halves.

4. The check valve according to claim 1, wherein said diaphragm is formed from elastomeric material.

5. The check valve according to claim 1, wherein said first slit section of said diaphragm has two slits, said two slits arranged in an angular relationship to one another, and said second slit section of said diaphragm has one slit.

6. The check valve; according to claim 1, wherein upon squeezing said inflation bulb, each said at least one slit of said first slit section is opened such that said discharge port is coextensive with said first intake port allowing for fluid flow through said first slit section and each said at least one slit of said second slit section is closed against a substantially continuous surface.

7. The check valve according to claim 1, wherein upon releasing said inflation bulb after said bulb has been squeezed, each said at least one slit of said second slit section is opened such that said second intake port is coextensive with said first intake port allowing for fluid flow through said second slit section and each said at least one slit of said first slit section is closed against a substantially continuous surface.

8. In a pressure infusion apparatus of the type having an infusion bag, a bladder for maintaining a fluid under pressure, a single-ended inflation bulb which is connected to the bladder to pump a flow of the fluid into the bladder thereby pressurizing same, and a pocket for holding the infusion bag in contact with the bladder to pressurize the infusion bag by transmission of pressure from the bladder, the improvement comprising:
    a body member, interposed between said inflation bulb and said bladder thereby establishing fluid communication therebetween, said body member comprising first and second intake ports, said first intake port adapted to be coupled to the single open end of said inflation bulb, and a discharge port; and
    a diaphragm disposed within said body member, said diaphragm having first and second slit sections, said first slit section adjacent to said first intake port, said second slit section disposed between and adjacent to said second intake port and said discharge port, each said slit section having at least one slit, so that when fluid is drawn into said second intake port, said at least one slit of said second slit section opens and said at least one slit of said first slit section is closed against a substantially continuous surface of said body member and when fluid is forced through said discharge port said at least one slit of said first slit section opens and said at least one slit of said second slit section is disposed against a substantially continuous surface of said body member.

9. A check valve, comprising:
    a body member comprising first and second fluid flow ports, said body member having first and second substantially continuous surfaces formed therein, said first continuous surface adjacent to said first fluid flow port, said second continuous surface adjacent to said second fluid flow port; and
    a flexible diaphragm disposed within said body member, said diaphragm having first and second slit sections, each of said slit sections having at least one slit and each of said slit sections having an upper and lower surface, said upper surface of said first slit section cooperative with said first fluid flow port and said lower surface of said first slit section disposed against said first continuous surface, said lower surface of said second slit section cooperative with said second fluid flow port and said upper surface of said second slit section disposed against said second continuous surface of said body member.

10. The check valve according to claim 9, wherein said first slit section opens in cooperation with said first fluid flow port to allow fluid flow through said first fluid flow port and simultaneously said second slit section closes against said second solid surface to prevent fluid flow through said second fluid flow port or, alternatively, said second slit section opens in cooperation with said second fluid flow port to allow fluid flow through said second fluid flow port and simultaneously said first slit section closes against said first solid surface to prevent fluid flow through said first fluid flow port.

11. The check valve according to claim 9, wherein said first slit section of said diaphragm has two slits, said two slits arranged in an angular relationship to one another, and said second slit section of said diaphragm has one slit.

* * * * *